US006231955B1

(12) United States Patent
Endo

(10) Patent No.: US 6,231,955 B1
(45) Date of Patent: May 15, 2001

(54) BIAXIALLY ORIENTED POLYESTER FILM

(75) Inventor: Kazuo Endo, Yokohama (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 0 days.

(21) Appl. No.: 09/337,454

(22) Filed: Jun. 21, 1999

(30) Foreign Application Priority Data

Jun. 22, 1998 (JP) .................................. 10-174381
Jun. 22, 1998 (JP) .................................. 10-174382

(51) Int. Cl.$^7$ .............................. B32B 7/00; B32B 27/20; B32B 27/36
(52) U.S. Cl. ......................... 428/215; 428/213; 428/323; 428/331; 428/480; 428/694 ST; 428/910
(58) Field of Search ..................... 428/213, 215, 428/216, 323, 331, 480, 694 ST, 694 SL, 694 SG, 910; 524/492, 493

(56) References Cited

U.S. PATENT DOCUMENTS 4,818,581   4/1989   Katoh et al. .................. 428/143

FOREIGN PATENT DOCUMENTS 257 611   3/1988   (EP) .
506 033 A1   9/1992   (EP) .
7-011020 * 1/1995   (JP) .

* cited by examiner

Primary Examiner—Vivian Chen
(74) Attorney, Agent, or Firm—Dike, Bronstein, Roberts & Cushman, LLP; David G. Conlin

(57) ABSTRACT

The present invention relates to a biaxially oriented polyester film comprising a polyester containing 0.001 to 3.0% by weight of porous spherical silica particles and having a degree of deformation of said porous spherical silica particles of 1.2 to 5.0, which polyester film is obtained from extruding and biaxially stretching said polyester containing said porous spherical silica particles having an average particle size of 0.3 to 15 μm, a sphericity ratio defined by the following equation (1) of 0.90 to 1.0 and a particle size distribution factor defined by the following equation (2) of 1.2 to 2.5.

Sphericity ratio=(projected area of particle)/(area corresponding to the circle of the maximum diameter on the particle projected plane)   (1)

Particle size distribution factor=$d_{10}/d_{90}$   (2)

where $d_{10}$ and $d_{90}$ are particle diameters (μm) at 10% and 90%, respectively, based on the total volume when the integrated volume of the group of particles was measured from the larger-diameter particle side.

6 Claims, No Drawings

BIAXIALLY ORIENTED POLYESTER FILM

BACKGROUND OF THE INVENTION

The present invention relates to a biaxially oriented polyester film. More particularly, it relates to a biaxially oriented polyester film having a relatively uniform surface with few coarse projections and also excelling in transparency, flatness, running properties and wear resistance.

Polyester films represented by polyethylene terephthalate films have excellent physical and chemical properties and are popularly used for many applications, such as graphic arts, displays, packages, etc., by taking advantage of their excellent transparency. They are also widely used in the fields of base films of magnetic recording media, capacitor materials and such.

In production of the films which are capable of making the best use of their properties such as transparency, running properties and wear resistance, it is especially required for such films to have good running properties for the reason of facilitating passage through the steps in the manufacturing process, treatments in the after-processing steps such as coating or deposition, and handling of the product itself, but such requirement was not attained sufficiently in the prior art. In most cases, attributable to friction and wear caused by high-speed contact between the film and the base material.

It is known that in order to improve the running properties and wear resistance of the film, generally, the film surface is roughened in an appropriate degree. For attaining this, a method is used in which fine particles are allowed to exist in the starting polyester. Although this method has come in practice in some quarters, it has not yet been realized to satisfy these property requirements to a high degree.

For example, in case where the so-called "precipitated particles" produced from the catalyst residue in the production of polyester are used as fine particles, there arise the problems such as unsatisfactory running properties and wear resistance because such particles are liable to break on film stretching, and difficulties in recycling the used material. In case of adding the inorganic compound particles inert to polyester, such as kaolin, silicon oxide, titanium dioxide and calcium phosphate, the running properties can indeed be improved since the particles won't be broken or deformed by film stretching and are capable of forming the relatively sharp projections. But because of their poor affinity for polyesters, voids may be formed around the particles when the film is stretched, causing a sharp deterioration of transparency, and also the particles tend to come off the film surface, causing formation of "white dust".

In another known particle addition method, there are used the silica particles having relatively good affinity for polyesters (Japanese Patent Application Laid-Open (KOKAI) No. 56-42629). Such particles, however, are liable to deform on stretching, making it hard to form the sharp projections on the film surface, so that the produced film may prove unsatisfactory in running properties. Also, since the silica particles are lump-shaped and have a very wide particle size distribution, many coarse projections exist in the produced film surface to deteriorate its flatness and transparency.

In order to overcome this antinomic phenomenon, use of the inorganic particles having a sharp particle size distribution is proposed recently. For instance, Japanese Patent Application Laid-Open (KOKAI) No. 62-207356 discloses monodisperse spherical silicon oxide particles. In use of these particles, however, because of their poor affinity for polyesters, voids may be formed around the particles depending on the stretching conditions, causing deterioration of transparency or fall-off of the particles.

As viewed above, there is yet available no polyester film which can satisfy the requirements for transparency, flatness, running properties and wear resistance to a well satisfactory degree and is also provided with other necessary properties.

As a result of the present inventor's earnest studies to solve the above problem, it has been found that the said problem can be easily solved by providing a film containing a specified amount of specific silica particles.

The present invention has been attained on the basis of the above finding.

SUMMARY OF THE INVENTION

An object of the present invention is to provide a biaxially oriented polyester film having a uniform surface and excellent running properties, wear resistance and transparency, and usable for a wide variety of applications, such as graphic arts, displays, packages, transfer marks, photographic plates, magnetic recording media, capacitors, etc.

Another object of the present invention is to provide a biaxially oriented laminated polyester film having a uniform surface and excellent running properties, wear resistance and transparency, and usable for a wide variety of applications, such as graphic arts, displays, packages, transfer marks, photographic plates, magnetic recording media, capacitors, etc.

To attain the above aim, in the first aspect of the present invention, there is provided a biaxially oriented polyester film comprising a polyester containing 0.001 to 3.0% by weight of porous spherical silica particles and having a degree of deformation of said porous spherical silica particles of 1.2 to 5.0, which polyester film is obtained from extruding and biaxially stretching said polyester containing said porous spherical silica particles having an average particle size of 0.3 to 15 μm, a sphericity ratio defined by the following equation (1) of 0.90 to 1.0 and a particle size distribution factor defined by the following equation (2) of 1.2 to 2.5.

Sphericity ratio=(projected area of particle)/(area corresponding to the circle of the maximum diameter on the particle projected plane)    (1)

Particle size distribution factor=$d_{10}/d_{90}$    (2)

where $d_{10}$ and $d_{90}$ are particle diameters (μm) at 10% and 90%, respectively, based on the total volume when the integrated volume of the group of particles was measured from the larger-diameter particle side.

In the second aspect of the present invention, there is provided a biaxially oriented laminated polyester film having a thickness of 5 to 250 μm and comprising:

at least one outermost layer comprising a polyester containing 0.001 to 3.0% by weight of porous spherical silica particles and having a degree of deformation of said porous spherical silica particles of 1.2 to 5.0; and other layer comprising polyester, which polyester film is obtained from co-extruding and biaxially stretching said polyester constituting said other layer and said polyester containing said porous spherical silica particles having an average particle size of 0.3 to 15 μm, a sphericity ratio defined by the following equation (1)

of 0.90 to 1.0 and a particle size distribution factor defined by the following equation (2) of 1.2 to 2.5, Sphericity ratio=(projected area of particle)/(area corresponding to the circle of the maximum diameter on the particle projected plane) (1)

Particle size distribution factor=$d_{10}/d_{90}$ (2)

where $d_{10}$ and $d_{90}$ are particle diameters (μm) at 10% and 90%, respectively, based on the total volume when the integrated volume of the group of particles was measured from the larger-diameter particle side.

the ratio of the total thickness of said outermost layers to the total film thickness being 0.01 to 0.4.

DETAILED DESCRIPTION OF THE INVENTION

The present invention is described in detail below.

When the term "polyester" is used in the present invention, it refers to the polyesters obtained by using terephthalic acid or its esters and ethylene glycol as the main starting materials, but it may contain other material(s) as third component.

For instance, it is possible to use as third component one or more types of dicarboxylic acids such as isophthalic acid, phthalic acid, 2,6-naphthalenedicarboxylic acid, terephthalic acid, sebacic acid, etc., and oxycarboxylic acids such as p-oxyethoxybenzoic acid.

As glycol moiety, there can be used one or more of ethylene glycol, propylene glycol, butanediol, 1,4-cyclohexanedimethanol, neopentyl glycol and the like.

In either case, the polyester used in the present invention is preferably the one in which not less than 80% of the repeating structural units is constituted by ethylene terephthalate units.

The polyester used in the present invention may further contain optional additives such as heat stabilizer, anti-blocking agent, antioxidant, colorant, antistatic agent, ultra-violet absorber, etc.

The biaxially oriented polyester film according to the present invention is a polyester film obtained by using the said polyester as a starting material, and the known methods can be used for the production thereof; its production process is not limited to the following exemplification as far as the structural requirements of the present invention are satisfied.

For obtaining the polyester film of the present invention, first a polyester is supplied to a known melt extruder where the polyester is heated to a temperature above the melting point thereof and melted. The molten polyester is extruded from a slit die and rapidly cooled to a temperature below the glass transition temperature and thereby solidified on a rotary cooling drum to obtain a non-oriented sheet which is substantially in an amorphous state. In this case, it is preferable to increase adherence of the sheet to the rotary cooling drum for improving flatness of the sheet. In the present invention, to this end, there are preferably used both or either of electrostatic pinning technique and liquid coating adhesion technique.

The said non-oriented sheet is stretched preferably 2 to 6 times in the machine direction at 70 to 145° C. to obtain a longitudinally monoaxially oriented film, and this film is further stretched 2 to 6 times in the transverse direction at 90 to 160° C. and then heat treated at 150 to 250° C. for a period of 1 to 600 seconds. It is also preferable that the film be relaxed 0.1 to 20% in the machine direction and/or the transverse direction in the highest temperature zone of the heat treatment and/or the green zone at the terminal of the heat treatment. If necessary, the film may be re-stretched in one or both directions.

The feature of the present invention resides in the use of porous spherical silica particles which can be deformed to a moderate degree by stretching. The inorganic particles commonly used as a polyester additive are not deformed per se even if a strong stress is applied to the particles when stretched, and the voids are formed around the particles. Such voids became a starting point of release of the particles from the film when the film surface wears down.

The present inventor has found that the risk of generating such voids around the particles can be minimized to remarkably improve running properties and wear resistance, when using the porous spherical silica particles having relatively good compatibility with the polyester, stretch conformability and a specified degree of deformability in the film.

The "degree of deformation of the particles" referred to in the present invention means the ratio of the maximum diameter to the minimum diameter of the particles existing in the film. The definition thereof is set forth below.

A small piece of film was molded with an epoxy resin by a stationary mold and, after cutting with a microtome, a section along the length of the film was observed. The maximum diameter and the minimum diameter of each of about 100 particles present within the area of 5 μm from the film section were measured, and the degree of deformation was determined from the following equation.

Degree of deformation=(maximum diameter of particle)/(minimum diameter of particle)

For obtaining the particles capable of a specified degree of deformation in the film from the original spherical particles before stretching, an appropriate combination of deformability of the particles per se and the stretching conditions is an important factor. That is, in the case of the particles which are relatively easy to deform, the degree of deformation enlarges even under the mild stretching conditions of low stretch ratio at a relatively high temperature. Conversely, in the case of the particles which are relatively hard to deform, it is necessary to give a strong stretching stress for obtaining a specified degree of deformation as defined in the present invention.

As a method for producing such particles, there is available a so-called "wet process" in which sodium silicate and a calcium salt such as calcium chloride are reacted to form calcium silicate, and the calcium silicate is decomposed with a mineral acid or carbon dioxide. The silica particles obtained from this wet process are the porous particles having a specific surface area of usually around 100 to 700 $m^2/g$, but their shape is not uniform and their particle size distribution is so broad that it may not be within the preferred range of size.

The present inventor have found that in the synthesis of silica particles using such wet process, it is possible to produce the porous spherical silica particles having a sharp particle size distribution and relatively easy to deform under a stretching stress in the film production process by properly selecting the production conditions such as co-existing ions in the system, reaction temperature, etc.

In the present invention, the porous spherical silica particles having a pre-stretch diameter ratio of 0.9 to 1.0 are placed under a particular stretching stress so that the degree of deformation of the particles falls within the range of 1.2 to 5.0, preferably 1.3 to 4.0, more preferably 1.3 to 3.0. When the degree of deformation is less than 1.2, voids are liable to form around the particles, causing a tendency for the particles to fall off the film. On the other hand, when the degree of deformation exceeds 5.0, the ability to form the projections is reduced to deteriorate the running properties of the produced film.

The average size of the porous spherical silica particles used in the present invention is 0.3 to 15 $\mu$m, preferably 0.5 to 10 $\mu$m. When the average particle size is less than 0.3 $\mu$m, the produced film may be unsatisfactory in running properties and wear resistance, and when the average particle size exceeds 15 $\mu$m, the surface roughness of the film becomes too high, deteriorating flatness of the film.

The amount of the porous spherical silica particles used in the present invention is 0.001 to 3% by weight, preferably 0.005 to 2% by weight. When their amount is less than 0.001% by weight, there can not be obtained the preferred running properties and wear resistance of the film, and when their amount exceeds 5% by weight, the surface roughness of the produced film becomes too high, hence the preferred flatness of the film can not be obtained.

In view of running properties of the film, it is preferable that the shape of the porous spherical silica particles used in the present invention is as close to spherical as possible, with the sphericity ratio falling within the range of 0.90 to 1.0, preferably 0.93 to 1.0, more preferably 0.96 to 1.0. When the sphericity ratio is less than 0.9, the preferred running properties may not be obtained.

The particle size distribution factor of the porous spherical silica particles used in the present invention is 1.2 to 2.5, preferably 1.5 to 2.3, more preferably 1.6 to 2.0. When the particle size distribution factor is less than 1.2, rolling up disturbance of the film may occur when it is rolled up, or the marks of the particles may be left on the film. Also, when the factor exceeds 2.5, the coarse particles may be mixed to deteriorate flatness of the film.

The specific surface area of the porous spherical silica particles used in the present invention is 100 to 600 $m^2/g$, preferably 300 to 600 $m^2/g$, more preferably 400 to 600 $m^2/g$. When the specific surface area is less than 100 $m^2/g$, the particle porosity becomes unsatisfactory and the particle affinity for the polyester is lost. Also, voids are formed around the particles when stretched, causing a deterioration of transparency of the film or a tendency for the particles to fall off the film. When the specific surface area exceeds 600 $m^2/g$, agglomeration of the particles tends to take place in the polyester preparation process, impairing flatness of the produced film.

As described above, according to the present invention, it is possible to obtain the preferred effects of the invention only by using the specific silica particles, but it is possible to add one or more of the other types of particles within limits not affecting the object of the present invention, for the purpose of further improving the film properties.

One type of such supplementary particles usable in the present invention is "precipitated particles". These are the particles which are precipitated in the reaction system when, for instance, a system using an alkaline metal or an alkaline earth metal compound as ester exchange catalyst is used and the polymerization is conducted by a conventional method. Terephthalic acid may be added during the ester exchange reaction or the polycondensation reaction to expedite precipitation. In these cases, it is also possible to introduce one or more phosphorus compounds such as phosphoric acid, trimethyl phosphate, triethyl phosphate, tributyl phosphate, acid ethyl phosphate, phosphorous acid, trimethyl phosphite, triethyl phosphite, tributyl phosphite, etc., into the reaction system. The particles of an inert material can also be precipitated by these methods in case where an esterification step is involved. For example, an alkaline metal or an alkaline earth metal compound is introduced before conclusion of or after the esterification reaction, and the polymerization reaction is carried out in the presence or absence of a phosphorus compound. In either case, at least one of such elements as calcium, lithium, antimony and phosphorus is contained in the fine precipitated compound produced in the course of polyester forming reaction.

Another example of supplementary particles usable in the present invention is so-called "added particles". These are the particles which are added from the outside to the polyester producing process. Examples of such added particles include kaolin, talc, carbon, molybdenum sulfide, gypsum, rock salt, aluminum oxide, barium sulfate, lithium fluoride, calcium fluoride, zeolite, calcium phosphate, silicon dioxide, and titanium dioxide.

In case where the average size of the supplementary particles is larger than that of the porous spherical silica particles used in the present invention, the amount (weight) of the supplementary particles used should not exceed the amount (weight) of the silica particles; it is preferably selected from within the range of 0.005 to 0.05 times, more preferably 0.01 to 0.3 times the amount by weight of the silica particles. In case where the average size of the supplementary particles is smaller than that of the silica particles, the supplementary particles can be used in an amount (weight) equal to or more than the silica particles, for instance, 1 to 100 times the amount (weight) of the silica particles.

In the present invention, it is possible to use two or more types of porous spherical silica particles differing in average size, provided that they satisfy the said particle property requirements.

The method of mixing the porous spherical silica particles with the polyester (used as a film forming material) is not specified in the present invention; it is possible to use a known method. For instance, the particles may be directly blended with the polyester chips, but preferably the particles are dispersed in ethylene glycol (starting material of polyester) to form an ethylene glycol slurry, and it is added to the reaction mixture at a stage in the polyester preparation process, preferably at a stage after the conclusion of the esterification reaction or ester exchange reaction and before the start of the polycondensation reaction, and then the polycondensation reaction is carried out.

The disperse slurry of the porous spherical silica particles used in the present invention can be prepared by a known method. For example, it can be prepared by dispersing the particles in ethylene glycol by a high-speed stirrer having plural shearing blades arranged parallel to the rotating direction of the agitating blades, a homomixer, an ultrasonic disperser or like means. The disperse slurry is preferably passed through a 1,000-mesh or smaller-mesh-size filter for the purpose of eliminating the coarse particles and non-dispersed agglomerates of particles in the slurry.

The thickness of the biaxially oriented polyester film according to the present invention is usually 1 to 350 $\mu$m, preferably 5 to 250 $\mu$m.

The biaxially oriented polyester film of the present invention may have other laminated layer(s) comprising polyester. That is, it may be a biaxially oriented laminated polyester film whose outermost layers are constituted by the said particle-containing film and inside layer comprises the said other layer(s) comprising polyester.

The term "biaxially oriented laminated polyester film" is used in the present invention to refer to the polyester films obtained by melt extruding all the film-forming layers by co-extrusion method (all the layers being melt co-extruded from the diehead), stretching and if necessary heat setting the extrudate. In the following, a three-layer-structure film is explained as the biaxially oriented laminated polyester film, but the laminated polyester films according to the present invention are not limited to the 3-layer films; they may be of two-layer or multi-layer structure having four or more layers as far as they satisfy the purpose of the present invention.

The inside layer of the film of the present invention may itself be of a multi-layer structure, in which case it is preferable that each layer is substantially a polyester layer. The above-mentioned types of polyester can be used as the polyester constituting the inside layer. The smaller the amount of the particles contained in the inside layer, the better for maintaining the preferred transparency of the whole laminated film. However, the particles may be contained as required in the inside layer within limits not contradicting the object of the present invention. The particles contained in the inside layer are preferably of the same type as used in the outermost layers. It is possible to mix regenerated polyester in the inside layer within limits not prejudicial to the cause of the present invention.

The overall thickness of the biaxially oriented laminated polyester film of the present invention is usually 5 to 250 $\mu$m, preferably 6 to 200 $\mu$m.

The ratio in total thickness of the outermost layers containing the said porous spherical silica particles to the whole laminate is 0.01 to 0.4, preferably 0.02 to 0.2. When the above thickness ratio is less than 0.01, it is hard to control the film thickness. When the above thickness ratio exceeds 0.4, film transparency may deteriorate.

Thus, in the present invention, by blending the specific silica particles in the outermost layers of a biaxially oriented laminated polyester film, it is possible to appreciably improve transparency, surface quality and running properties of the obtained polyester film, which enables application of this type of polyester films as base film for magnetic recording media such as magnetic tapes and floppy discs, capacitors, photographic plates, packages and various other products.

A process for producing the biaxially oriented laminated film of the present invention is described in detail below, but the present invention is not limited to the following exemplification as far as the essential structural requirements of the invention are satisfied.

The "co-extrusion system" referred to in the present invention is a system according to which the polymers of the compositions corresponding to the respective layer structures to be formed are supplied to the separate melt extruders where they are heated to the temperatures above their melting points and melted, then extruded from the laminar dies corresponding to the respective layer structures into a laminated molten sheet, and then quickly cooled and solidified to obtain a sheet of a substantially amorphous state, and this amorphous sheet is stretched.

For producing a laminated film according to this co-extrusion system, for instance the process set forth below is followed. An inside layer-forming polyester substantially free of fine particles and an outermost layer-forming polyester containing a predetermined amount of specific silica particles are supplied to the respective melt extruders where the said respective polyesters are heated to the temperatures above their melting points and melted, and then extruded from the respective laminar dies as a molten laminated sheet onto the surface of a rotary cooling drum, the said sheet being quickly cooled to a temperature below the glass transition point and solidified on said drum, and the thus formed substantially amorphous sheet is biaxially stretched.

When the said molten laminated sheet is extruded onto the surface of the rotary cooling drum, electrostatic pinning technique is used for enhancing adhesion between the molten sheet and the cooling drum. This electrostatic pinning technique is a method in which the charging electrodes are disposed in close adjacency to the molten sheet in the direction orthogonal to the movement of the sheet, and approximately 5 to 10 kV DC voltage is applied to the said electrodes to give a static charge to the molten sheet so as to enhance sheet adherence to the cooling drum by the generated static force. Liquid coat adhesion technique can be used in combination with the said electrostatic pinning technique. This liquid coat adhesion technique is a method in which a liquid is applied uniformly on the entirety or a part (for example, the portion with which both ends of the sheet contact) of the rotary cooling drum surface to thereby enhance adhesion between the drum and the sheet.

The film of the present invention has a uniform surface and excels in running properties, wear resistance and transparency, so that it can be applied to a variety of uses, such as graphic arts, displays, packages, transfer marks, photographic plates, magnetic recording media, capacitors, etc. Thus, the present invention is of very high industrial value.

EXAMPLES

The present invention is described in further detail by showing the examples thereof, which examples however are merely intended to be illustrative and not to be construed as limiting the scope of the invention. The property determination methods used in the present invention are as described below. In the following Examples, all "parts" and "%" are by weight unless otherwise noted.

(1) Average Diameter and Particle Size Distribution

The diameters of the particles before added to the polyester were measured by electron micrography and converted to equivalent sphere basis. For determination of particle size distribution, the diameters of approximately 1,000 particles were measured and their volumes were integrated from the larger-diameter particle side. Sharpness of the particle size distribution was expressed by the value of the $d_{10}/d_{90}$ ratio where $d_{10}$ is the diameter of the particles which account for 10% of the total volume integrated from the larger-diameter particle side and $d_{90}$ is the diameter of the particles which account for 90% of the total volume integrated from the larger-diameter particle side. The closer to 1 this ratio is, the more sharp is the particle size distribution. Average particle size is expressed by d50 ($\mu$m).

(2) Sphericity Ratio

The projected areas of about 1,000 particles before added to the polyester and the area corresponding to the circle of the maximum diameter on the projected plane were measured by electron micrography, and the sphericity ratio was determined from the following equation.

Sphericity ratio=(projected area of particle)/(area corresponding to the circle of the maximum diameter on the particle projected plane)

(3) Specific Surface Area

The specific surface area was determined with the particles before added to the polyester using a full-automatic surface meter (mfd. by CARLO ERBA Co., Ltd.) by the nitrogen adsorption/desorption method.

(4) Degree of Deformation

The degree of deformation was determined by the above-mentioned method and equation.

(5) Intrinsic Viscosity 1 g of polymer was dissolved in 100 ml of a phenol/tetrachloroethane (50/50 by weight) mixed solvent, and the viscosity of the solution was measured at 30.0° C.

(6) Transparency

Film haze was measured by an Ulbricht sphere hazeometer NDH-20D (mfd. by Nippon Denshoku Kogyo KK) according to JIS-K6714.

(7) Running Properties

Two pieces of film, cut to a width of 15 mm and a length of 150 mm, were placed one over the other on a flat glass plate, then a rubber plate was placed thereon, and the two pieces of film were let move sliding against each other at a rate of 20 mm/min under a film contact pressure of 2 g/cm$^2$. The generated frictional force was measured, and coefficient of friction at the point of 5 mm slide was determined as coefficient of dynamic friction. Measurement was made in an atmosphere of 23±1° C. and 50±5% RH.

(8) Film Winding Properties

The produced film was wound up by a length of 6,000 meters on a 15 cm-diameter cardboard cylinder at a line speed of about 170 m/min, and the condition of the edge of the roll of the film was examined and rated according to the following 4-grade ranking system.

A: The edge was uniform in its entirety.
B: The edge was almost uniform and acceptable for practical use.
C: The edge was partly non-uniform.
D: The edge was non-uniform in large part.

(9) Abrasion Quality

Abrasion quality was evaluated by the amount of white dust of abrasion generated. Each sample film, contacted with a 6 mm-diameter fixed hard chrome plated pin at a winding angle of 135°, was let run along a total distance of 1,000 meters at a speed of 13 m/min with a tension of about 200 g. The amount of white dust of abrasion deposited on the pin was visually examined, and evaluation was made according to the following criterion.

Rank A: No deposition of dust was observed.
Rank B: Slight deposition of dust was seen.
Rank C: A small amount (more amount than Rank B) of dust deposited on the pin.
Rank D: Dust deposited heavily on the pin.

(10) Number of Coarse Projections 10 mg of sample was weighed out, held in a 18×18 mm cover glass and pressed at 280 to 290° C. to make a film of about 10 mm in diameter. This film was observed under a phase-contrast microscope (100× magnification), and the number of the particles having a maximum length of 10 $\mu$m or more was counted and shown here as the number of coarse projections.

(11) Total Evaluation

○: Excellent and high in industrial value.
Δ: Partially defective in manufacture and film quality, and low in industrial value.
X: Seriously defective in manufacture and film quality, and low in industrial value.

<Production of Polyester A>

100 parts of dimethyl terephthalate, 60 parts of ethylene glycol and 0.09 parts of magnesium acetate tetrahydrate were supplied into a reactor. The mixture in the reactor was heated to evaporate away methanol and carry out an ester exchange reaction. The mixture was heated to 230° C., taking 4 hours from start of the reaction, to substantially complete the ester exchange reaction.

Then 0.1 part of porous spherical silica particles having an average size of 2.05 $\mu$m, a sphericity ratio of 0.98, a particle size distribution factor of 1.83 and a specific surface area of 520 m$^2$/g was added in the form of an ethylene glycol slurry, after which 0.04 part of ethylene acid phosphate and 0.04 part of antimony trioxide were further added to conduct a polycondensation reaction for 4 hours to obtain polyethylene terephthalate (polyester A).

Intrinsic viscosity of the obtained polyester A was 0.63. Microscopical observation of the inside of the product confirmed that the particles were dispersed uniformly.

<Production of Polyester B>

Polyester B was produced by following the same procedure as in the production of polyester A except that no silica particles were added.

Example 1

<Production of Polyester Film>

A biaxially oriented polyester film was produced using polyester A in the following way. The polyester was extruded into a sheet at 295° C. to produce a 173 $\mu$m thick amorphous sheet using the electrostatic pinning technique. This amorphous sheet was stretched 3.6 times in the machine direction at 90° C., then further stretched 4.0 times in the direction orthogonal to the machine direction at 110° C., and heat treated at 230° C. for 3 seconds to obtain a 12 $\mu$m thick polyester film.

Example 2

A biaxially stretched film was obtained in the same way as in Example 1 except that the thickness of the amorphous sheet was 123 $\mu$m, and that the amorphous sheet was stretched 3.2 times in the machine direction at 90° C. and then stretched 3.2 times in the direction orthogonal to the machine direction at 110° C.

Comparative Examples 1–8 and Examples 3–4

Biaxially stretched films were obtained in the same way as in Example 1 except that the particles blended in the film were changed as shown in Table 1.

Aluminum oxide used in Example 2 was the one having a delta-type crystal form obtained by the thermal decomposition method. The precipitated particles used in Example 3 were the particles containing 1% by weight each of element calcium, element lithium and element phosphorus.

The obtained results are shown collectively in Table 1.

TABLE 1

|  | Example 1 | Example 2 | Comp. Example 1 |
|---|---|---|---|
| Particle properties |  |  |  |
| Type of particle | Porous spherical silica | Porous spherical silica | Porous spherical silica |
| Average particle size (μm) | 2.05 | 2.05 | 2.05 |
| Content (%) | 0.1 | 0.1 | 0.0005 |
| Sphericity ratio | 0.98 | 0.98 | 0.98 |
| Particle size distribution factor | 1.83 | 1.83 | 1.83 |
| Polyester film |  |  |  |
| Stretch ratio | 3.6 ×4.0 | 3.2 × 3.2 | 3.6 × 4.0 |
| Degree of deformation | 2.1 1.4 | 2.1 | |
| Transparency (%) | 2.2 | 2.5 | 0.7 |
| Running properties | 0.33 | 0.28 | ≧0.7 |
| Film winding properties | A | A | D |
| Abrasion quality | A | A | D |
| Number of coarse projections | 0 | 0 | 0 |
| Total evaluation | ○ | ○ | x |

|  | Comp. Example 2 | Comp. Example 3 | Comp. Example 4 |
|---|---|---|---|
| Particle properties |  |  |  |
| Type of particle | Porous spherical silica | Porous spherical silica | Porous spherical silica |
| Average particle size (μm) | 2.05 | 0.24 | 17.2 |
| Content (%) | 3.2 | 0.1 | 0.1 |
| Sphericity ratio | 0.98 | 0.98 | 0.98 |
| Particle size distribution factor | 1.83 | 1.95 | 1.75 |
| Polyester film |  |  |  |
| Stretch ratio | 3.6 × 4.0 | 3.2 × 4.0 | 3.6 × 4.0 |
| Degree of deformation | 2.1 | 1.8 | 2.2 |
| Transparency (%) | 5.5 | 1.0 | 14.1 |
| Running properties | 0.24 | ≧0.7 | 0.22 |
| Film winding properties | A | D | A |
| Abrasion quality | A | D | A |
| Number of coarse projections | 6 | 0 | 36 |
| Total evaluation | x | x | x |

|  | Comp. Example 5 | Comp. Example 6 | Comp. Example 7 | Comp. Example 8 |
|---|---|---|---|---|
| Particle properties |  |  |  |  |
| Type of particle | Porous spherical silica | Porous spherical silica | spherical silica | Porous lumpy silica |
| Average particle size (μm) | 2.03 | 2.05 | 2.56 | 2.64 |
| Content (%) | 0.1 | 0.1 | 0.1 | 0.1 |
| Sphericity ratio | 0.98 | 0.98 | 0.99 | 0.75 |
| Particle size distribution factor | 1.14 | 3.27 | 1.10 | 2.65 |
| Polyester film |  |  |  |  |
| Stretch ratio | 3.6 × 4.0 | 3.2 × 4.0 | 3.6 × 4.0 | 3.6 × 4.0 |
| Degree of deformation | 2.0 | 2.2 | 1.0 | 2.6 |
| Transparency (%) | 2.0 | 4.6 | 6.5 | 3.8 |
| Running properties | 0.36 | 0.37 | 0.26 | 0.56 |
| Film winding properties | C | A | B | B |
| Abrasion quality | A | D | C | A |
| Number of coarse projections | 0 | 31 | 0 | 22 |
| Total evaluation | Δ | x | x | x |

TABLE 1-continued

|  | Example 3 | Example 4 |
|---|---|---|
| Particle properties | | |
| First type of particle | Porous spherical silica | Porous spherical silica |
| Average particle size ($\mu$m) | 2.05 | 2.56 |
| Content (%) | 0.01 | 0.01 |
| Sphericity ratio | 0.98 | 0.98 |
| Particle size distribution factor | 1.83 | 1.83 |
| Second type of particle | Aluminum oxide | Precipitated particles |
| Average particle size ($\mu$m) | 0.03 | 0.40 |
| Content (%) | 0.3 | 0.2 |
| Polyester film | | |
| Stretch ratio | 3.2 × 4.0 | 3.6 × 4.0 |
| Degree of deformation | 2.1 | 2.1 |
| Transparency (%) | 2.6 | 3.1 |
| Running properties | 0.371 | 0.21 |
| Film winding properties | A | A |
| Abrasion quality | A | A |
| Number of coarse projections | 0 | 2 |
| Total evaluation | ○ | ○ |

Example 5
<Production of Laminated Polyester Film>

Polyester B was dried at 180° C. for 4 hours and supplied into the main extruder set at 285° C., while polyester A was dried at 180° C. for 4 hours and supplied into the sub-extruder set at 285° C. The sub-extruder used here was a double-screw extruder with the screws arranged to turn in the opposite directions, and the main extruder was an ordinary single-screw extruder. The polymer in the sub-extruder was bifurcated into two portions forming the front and rear surface layers (outermost layers) of the film, joined in the feed block with the polymer from the main extruder after passing through a gear pump and a filter, then extruded into a sheet, and quickly cooled and solidified on a rotary cooling drum set at a surface temperature of 30° C. utilizing the electrostatic pinning technique to obtain a 2,160 $\mu$m thick, substantially amorphous sheet.

The thus obtained amorphous sheet was stretched 3.6 times in the machine direction at 83° C., then further stretched 4.0 times in the transverse direction at 90° C., and heat treated at 230° C. for 10 seconds while being relaxed 2% in the width direction to obtain a biaxially stretched three-layer (3 $\mu$m/144 $\mu$m/3 $\mu$m) laminated polyester film with an overall thickness of 150 $\mu$m.

Example 6

A biaxially stretched film was produced in the same way as in Example 5 except that the thickness of the amorphous sheet was 1,536 $\mu$m, and that the said amorphous sheet was stretched 3.2 times in the machine direction at 90° C. and then stretched 3.2 times in the direction orthogonal to the machine direction at 110° C.

Comparative Examples 9–16 and Examples 7–8

Biaxially stretched films were produced in the same way as in Example 5 except that the particles blended in the outermost layers were changed as shown in Table 2.

Aluminum oxide used in Example 6 was the one having a delta-type crystal form obtained by the thermal decomposition method, and the precipitated particles used in Example 7 were the particles containing not less than 1% by weight each of element calcium, element lithium and element phosphorus.

The obtained results are shown collectively in Table 2.

TABLE 2

|  | Example 5 | Example 6 | Comp. Example 9 | Comp. Example 10 |
|---|---|---|---|---|
| Layer structure | | | | |
| Outermost layer thickness | 3 | 3 | 3 | 3 |
| Inside layer thickness | 144 | 144 | 144 | 144 |
| Outermost layer/whole laminate | 0.040 | 0.040 | 0.040 | 0.040 |
| Particle properties | | | | |
| Type of particle | Porous spherical silica | Porous spherical silica | Porous spherical silica | Porous spherical silica |
| Average particle size ($\mu$m) | 2.05 | 2.05 | 2.05 | 2.05 |
| Content (%) | 0.1 | 0.1 | 0.0005 | 3.2 |
| Sphericity ratio | 0.98 | 0.98 | 0.98 | 0.98 |
| Particle size distribution factor | 1.83 | 1.83 | 1.83 | 1.83 |
| Polyester film | | | | |
| Stretch ratio | 3.6 × 4.0 | 3.2 × 3.2 | 3.6 × 4.0 | 3.6 × 4.0 |
| Degree of deformation | 2.1 | 1.5 | 2.1 | 2.1 |
| Transparency (%) | 1.8 | 1.7 | 0.7 | 5.5 |
| Running properties | 0.33 | 0.28 | ≧0.7 | 0.24 |
| Film winding properties | A | A | D | A |
| Abrasion quality | A | A | D | A |

TABLE 2-continued

|  | | | | |
|---|---|---|---|---|
| Number of coarse projections | 0 | 0 | 0 | 6 |
| Total evaluation | ○ | ○ | x | x |

|  | Comp. Example 11 | Comp. Example 12 | Comp. Example 13 |
|---|---|---|---|
| Layer structure | | | |
| Outermost layer thickness | 3 | 3 | 3 |
| Inside layer thickness | 144 | 144 | 144 |
| Outermost layer/ whole laminate | 0.040 | 0.040 | 0.040 |
| Particle properties | | | |
| Type of particle | Porous spherical silica | Porous spherical silica | Porous spherical silica |
| Average particle size ($\mu$m) | 0.24 | 17.2 | 2.03 |
| Content (%) | 0.1 | 0.1 | 0.1 |
| Sphericity ratio | 0.98 | 0.98 | 0.98 |
| Particle size distribution factor | 1.95 | 1.75 | 1.14 |
| Polyester film | | | |
| Stretch ratio | 3.6 × 4.0 | 3.6 × 4.0 | 3.6 × 4.0 |
| Degree of deformation | 1.8 | 2.2 | 2.0 |
| Transparency (%) | 1.0 | 14.5 | 1.8 |
| Running properties | ≧0.7 | 0.22 | 0.34 |
| Film winding properties | D | A | C |
| Abrasion quality | D | A | A |
| Number of coarse projections | 0 | 36 | 0 |
| Total evaluation | x | x | Δ |

|  | Comp. Example 14 | Comp. Example 15 | Comp. Example 16 |
|---|---|---|---|
| Layer structure | | | |
| Outermost layer thickness | 3 | 3 | 3 |
| Inside layer thickness | 144 | 144 | 144 |
| Outermost layer/ whole laminate | 0.04 | 0.040 | 0.040 |
| Particle properties | | | |
| Type of particle | Porous spherical silica | Spherical silica | Porous lumpy silica |
| Average particle size ($\mu$m) | 2.05 | 2.56 | 2.64 |
| Content (%) | 0.1 | 0.1 | 0.1 |
| Sphericity ratio | 0.98 | 0.98 | 0.75 |
| Particle size distribution factor | 3.27 | 1.10 | 2.65 |
| Polyester film | | | |
| Stretch ratio | 3.6 × 4.0 | 3.6 × 4.0 | 3.6 × 4.0 |
| Degree of deformation | 2.2 | 1.0 | 2.6 |
| Transparency (%) | 2.1 | 5.5 | 3.1 |
| Running properties | 0.31 | 0.26 | 0.56 |
| Film winding properties | A | B | B |
| Abrasion quality | D | C | A |
| Number of coarse projections | 21 | 0 | 22 |
| Total evaluation | x | x | x |

|  | Example 7 | Example 8 |
|---|---|---|
| Layer structure | | |
| Outermost layer thickness | 3 | 3 |
| Inside layer thickness | 144 | 144 |
| Outermost layer/ whole laminate | 0.040 | 0.040 |
| Particle properties | | |
| First type of particle | Porous spherical silica | Porous spherical silica |
| Average particle size ($\mu$m) | 2.05 | 2.05 |
| Content (%) | 0.01 | 0.01 |
| Sphericity ratio | 0.98 | 0.98 |
| Particle size distribution factor | 1.83 | 1.83 |
| Second type of particle | Aluminum oxide | Precipitated particles |
| Average particle size ($\mu$m) | 0.03 | 0.40 |
| Content (%) | 0.3 | 0.2 |
| Polyester film | | |
| Stretch ratio | 3.6 × 4.0 | 3.6 × 4.0 |
| Degree of deformation | 2.1 | 2.1 |
| Transparency (%) | 2.3 | 3.0 |
| Running properties | 0.31 | 0.21 |
| Film winding properties | A | A |
| Abrasion quality | A | A |
| Number of coarse projections | 0 | 2 |
| Total evaluation | ○ | ○ |

What is claimed is:

1. A biaxially oriented polyester film comprising a polyester containing 0.001 to 3.0% by weight of porous spherical silica particles and having a degree of deformation of said porous spherical silica particles of 1.2 to 5.0, which polyester film is obtained from extruding and biaxially stretching said polyester containing said porous spherical silica particles having an average particle size of 0.3 to 15 $\mu$m, a sphericity ratio defined by the following equation (1) of 0.90 to 1.0 and a particle size distribution factor defined by the following equation (2) of 1.2 to 2.5, $$\text{Sphericity ratio} = \text{(projected area of particle)/(area corresponding to the circle of the maximum diameter on the particle projected plane)} \quad (1)$$

$$\text{Particle size distribution factor} = d_{10}/d_{90} \quad (2)$$

where $d_{10}$ and $d_{90}$ are particle diameters ($\mu$m) at 10% and 90%, respectively, based on the total volume when the integrated volume of the group of particles was measured from the larger-diameter particle side.

2. A polyester film according to claim 1, wherein the specific surface area of the porous spherical silica particles is 100 to 600 m²/g.

3. A polyester film according to claim 1, which further has a film thickness of 1 to 350 μm.

4. A polyester film according to claim 1, which further has at least one laminated other layer comprising a polyester.

5. A polyester film according to claim 4, which further has an overall thickness of the film of 5 to 250 μm.

6. A polyester film according to claim 4, wherein the thickness ratio of the layer containing the porous spherical silica particles to the whole laminate is 0.01 to 0.4.

* * * * *